United States Patent
Cho

(10) Patent No.: US 10,807,601 B1
(45) Date of Patent: Oct. 20, 2020

(54) SHIFT CONTROL METHOD FOR HYBRID VEHICLE HAVING DUAL CLUTCH TRANSMISSION

(71) Applicants: Hyundai Motor Company, Seoul (KR); Kia Motors Corporation, Seoul (KR)

(72) Inventor: Sung Hyun Cho, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/512,918

(22) Filed: Jul. 16, 2019

(30) Foreign Application Priority Data

Feb. 22, 2019 (KR) .................. 10-2019-0020830

(51) Int. Cl.
 *B60W 30/19* (2012.01)
 *F16H 61/00* (2006.01)
(52) U.S. Cl.
 CPC ....... *B60W 30/19* (2013.01); *F16H 2061/009* (2013.01); *F16H 2061/0093* (2013.01); *F16H 2061/0096* (2013.01)
(58) Field of Classification Search
 None
 See application file for complete search history.

(56) References Cited

U.S. PATENT DOCUMENTS

| | | | |
|---|---|---|---|
| 7,762,925 B2 | 7/2010 | Dickinson | |
| 8,002,059 B2 | 8/2011 | Tanishima | |
| 9,981,651 B2 | 5/2018 | Johri et al. | |
| 2003/0163235 A1* | 8/2003 | Tokura | B60W 10/11 701/67 |
| 2005/0064987 A1* | 3/2005 | Budal | B60W 10/06 477/3 |
| 2012/0318626 A1* | 12/2012 | Jeon | F16H 61/061 192/3.57 |
| 2017/0067559 A1* | 3/2017 | Cho | F16D 48/062 |
| 2017/0234375 A1* | 8/2017 | Cho | F16D 48/062 477/181 |

FOREIGN PATENT DOCUMENTS

| | | |
|---|---|---|
| JP | 2004-150549 A | 5/2004 |
| JP | 2010-076677 A | 4/2010 |
| KR | 10-1490954 B1 | 2/2015 |
| KR | 10-1566755 B1 | 11/2015 |
| KR | 10-2017-0066817 A | 6/2017 |

* cited by examiner

*Primary Examiner* — Timothy Hannon
(74) *Attorney, Agent, or Firm* — Morgan, Lewis & Bockius LLP

(57) ABSTRACT

A shift control method for a hybrid vehicle having a dual clutch transmission may include an undershoot determination step of determining, by a controller, whether the amount of undershoot occurring during an inertia phase of power-off upshift is equal to or greater than a prescribed reference amount, a response-starting step of starting, by the controller, when the amount of undershoot is equal to or greater than the prescribed reference amount, coordinated engine torque control using a first coordinated torque, which is determined as the larger one of engine model torque determined from a model and engine map torque obtained from a map in a response to clutch slippage, and a response-maintaining step of determining, by the controller, second coordinated torque to control the engine and controlling engine torque until the inertia phase is completed.

8 Claims, 2 Drawing Sheets

SHIFT CONTROL METHOD FOR HYBRID VEHICLE HAVING DUAL CLUTCH TRANSMISSION

CROSS-REFERENCE TO RELATED APPLICATION

The present application claims priority to Korean Patent Application No. 10-2019-0020830, filed on Feb. 22, 2019, the entire contents of which is incorporated herein for all purposes by this reference.

BACKGROUND OF THE INVENTION

Field of the Invention

The present invention relates to a shift control method for a hybrid vehicle having a dual clutch transmission (DCT), and more particularly to a power-off upshift control method.

Description of Related Art

"Power-off upshift" signifies a shift to a higher gear, which is performed in the state in which an accelerator is released.

There are various types of hybrid powertrains. Among these, there is a "mild hybrid system", which is constructed such that a motor is connected to an engine at all times and thus performs engine start, power assistance and regenerative braking.

A vehicle provided with a mild hybrid powertrain may be controlled such that regenerative braking is performed during power-off upshift in the state in which an accelerator is released to maximize the regenerative braking function. In the instant case, the torque of an engine and the regenerative braking torque of a motor act on the input shaft of a dual clutch transmission (DCT).

However, when regenerative braking torque by a motor as well as torque of an engine act on the input shaft of the DCT during power-off upshift, there may occur a violent undershoot phenomenon in which the rotation speed of the engine becomes lower than the speed of an engagement-side clutch, which is connected to gears for a target shifting stage, during an inertia phase at the time of initial operation of the power-off upshift.

An excessive undershoot phenomenon deteriorates the shifting sensation and drivability of a vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift control method for a hybrid vehicle having a dual clutch transmission (DCT), which may immediately eliminate an excessive undershoot phenomenon, which may occur during power-off upshift of a hybrid vehicle having a DCT, improving a shifting sensation and drivability and consequently enhancing the marketability of the vehicle.

In accordance with various aspects of the present invention, the above and other objects may be accomplished by the provision of a shift control method for a hybrid vehicle having a dual clutch transmission, the shift control method including an undershoot determination step of determining, by a controller, whether the amount of undershoot occurring during an inertia phase of power-off upshift is equal to or greater than a prescribed reference amount, a response-starting step of starting, by the controller, when the amount of undershoot is equal to or greater than the prescribed reference amount, coordinated engine torque control using a first coordinated torque, which is determined as the larger one of engine model torque determined from a model and engine map torque obtained from a map in a response to clutch slippage, and a response-maintaining step of determining, by the controller, second coordinated torque to control the engine and controlling engine torque until the inertia phase is completed.

The model from which the engine model torque is determined may be expressed as follows:

$$Te\_m = T_{c\_app} + Je[(dSlip/dt)_{target} + dNi/dt] + \alpha$$

where Te_m represents engine model torque, $T_{c\_app}$ represents torque of an engagement-side clutch, $J_e$ represents a moment of inertia of the engine, Slip represents clutch slippage (=Ne−Ni), Ne represents a rotation speed of the engine, Ni represents a speed of the engagement-side clutch, and $\alpha$ represents torque caused by inertia of a driving system.

The map used for determination of the engine map torque may be configured to determine the engine map torque in a response to clutch slippage and basic input torque.

The second coordinated torque at the response-maintaining step may be determined as follows:

$$Te(t) = \mathrm{MAX}\{\mathrm{MAX}[TQI\_J, Te(t-1) + \mathrm{Ramp\ Down}], MAP[Slip, TQI\_J]\}$$

where Te(t) represents coordinated torque in a current control cycle, Te(t−1) represents coordinated torque in a previous control cycle, TQI_J represents basic input torque, Ramp Down represents an amount of torque reduced at a constant inclination, Slip represents clutch slippage (=Ne−Ni), Ne represents a rotation speed of the engine, and Ni represents a speed of an engagement-side clutch.

After the response-maintaining step, to cause the second coordinated torque to gradually converge to basic input torque, the controller may perform a torque handover step of determining third coordinated torque, controlling the engine torque based on the third coordinated torque, gradually increasing torque of an engagement-side clutch, and gradually reducing torque of a disengagement-side clutch until the disengagement-side clutch is disengaged.

The third coordinated torque at the torque handover step may be determined as follows:

$$Te(t) = \mathrm{MAX}[TQI\_J, Te(t-1) + \mathrm{Ramp\ Down}]$$

where Te(t) represents coordinated torque in a current control cycle, Te(t−1) represents coordinated torque in a previous control cycle, TQI_J represents basic input torque, and Ramp Down represents an amount of torque reduced at a constant inclination.

If clutch slippage is maintained at a prescribed reference amount of slippage or less for a prescribed reference maintenance time period during the torque handover step, the controller may perform a shift-completing step of completing shift operation by increasing the torque of the engagement-side clutch so that the engagement-side clutch is prevented from slipping with respect to the basic input torque.

The torque of the engagement-side clutch at the shift-completing step may be determined as follows:

$$Tc_{app}(t) = Tc_{app}(t-1) + \{[|TQI\_J*\text{Factor}(\text{Speed},TQI\_J)| - Tc_{app}(t-1)]/[\text{Target Time} - \text{Phase Time}]\}$$

where $Tc_{app}(t)$ represents torque of the engagement-side clutch in a current control cycle, $Tc_{app}(t-1)$ represents torque of the engagement-side clutch in a previous control cycle, TQI_J represents basic input torque, Target Time represents a target time period required for completion of a torque phase, and Phase Time represents an elapsed time taken for the torque phase.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
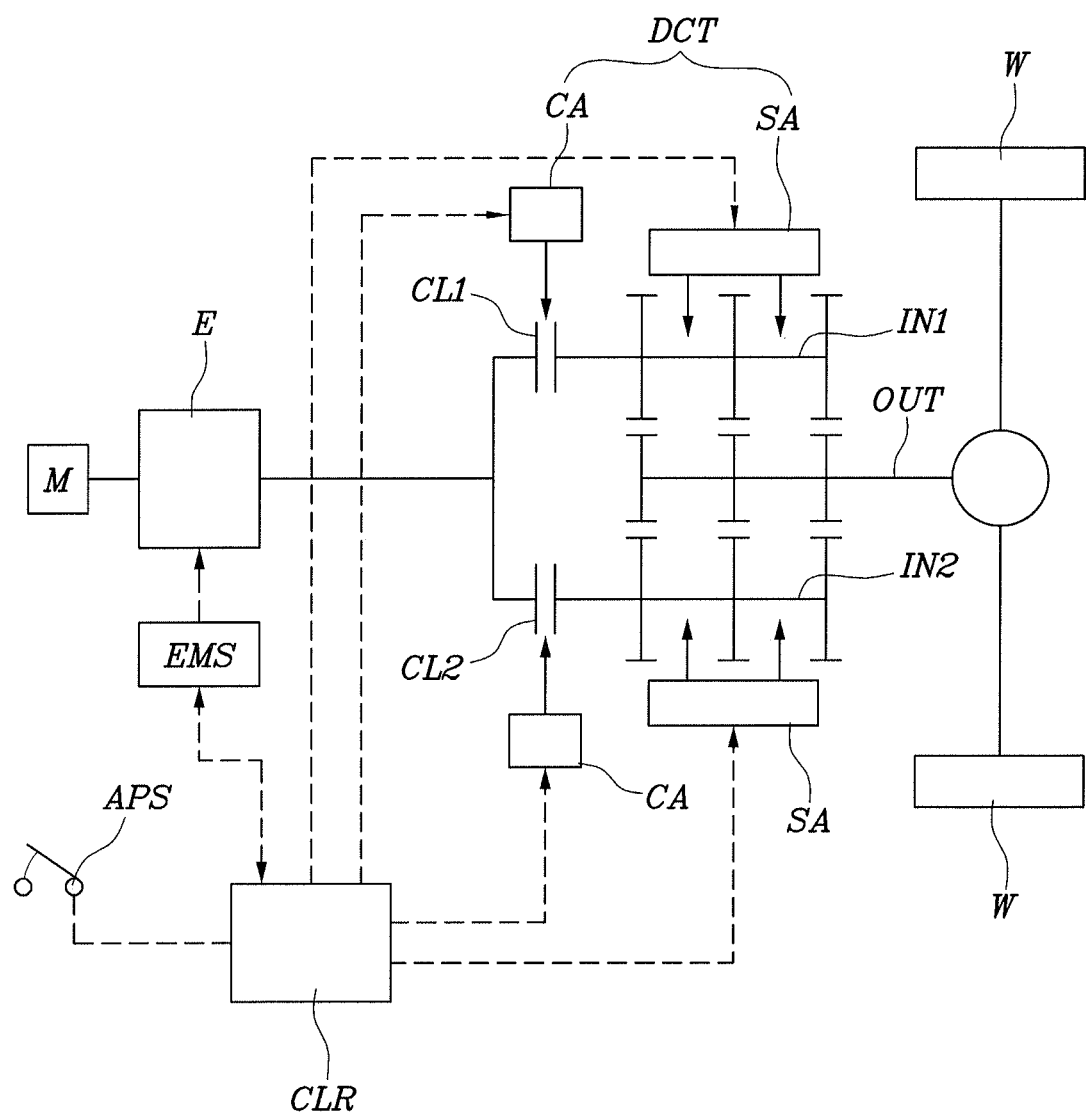
FIG. 1 is a view exemplarily illustrating the construction of a hybrid vehicle having a DCT to which the present invention is applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a shift control method for a hybrid vehicle having a DCT according to an exemplary embodiment of the present invention will be described in detail with reference to the accompanying drawings.

FIG. 1 is a view exemplarily illustrating the construction of a hybrid vehicle having a DCT to which the present invention is applicable. The hybrid vehicle may include a mild hybrid powertrain, in which power of an engine E is transmitted to a first input shaft IN1 and a second input shaft IN2 of a DCT via a first clutch CL1 and a second clutch CL2, respectively, and, after being changed in speed, is supplied to driving wheels W via an output shaft OUT and in which the engine E is connected to a motor M configured to perform engine start, power assistance and regenerative braking.

Furthermore, the hybrid vehicle further includes clutch actuators CA for driving the first clutch CL1 and the second clutch CL2, shift actuators SA having selecting and shifting is configured to shift gears, and a controller CLR for controlling the clutch actuators CA and the shift actuators SA to automatically shift gears.

The controller CLR receives information related to the extent to which a driver depresses an accelerator through an accelerator position sensor (APS) and also receives information related to the speed and a torque of the engine and the speed of the vehicle. The controller CLR controls the clutch actuators CA and the shift actuators SA based on the above information so that the DCT shifts gears automatically depending on the driving state of the vehicle.

The engine is controlled by an engine management system (EMS), which is separately provided. Via communication with the EMS, the controller CLR may receive information related to the engine and may request the EMS to control the torque of the engine depending on the driving state and the shift state of the vehicle, and the EMS may control the engine in a response to the request.

The controller CLR may be implemented as a transmission management system (TMS). Depending on the exemplary embodiment of the present invention, the controller CLR may be implemented as an integral control system in which the EMS and the TMS are integrated. The motor may be configured to be controlled in harmony with the engine and the DCT by the TMS, the EMS or a separate controller.

During the shift operation, any one of the first clutch CL1 and the second clutch CL2 performs a disengagement operation, and the other one performs an engagement operation. That is, depending on the shift situation, one of the two clutches becomes a disengagement-side clutch, which is disengaged from the engine, and the other one becomes an engagement-side clutch, which is engaged with the engine.

Figure 2:
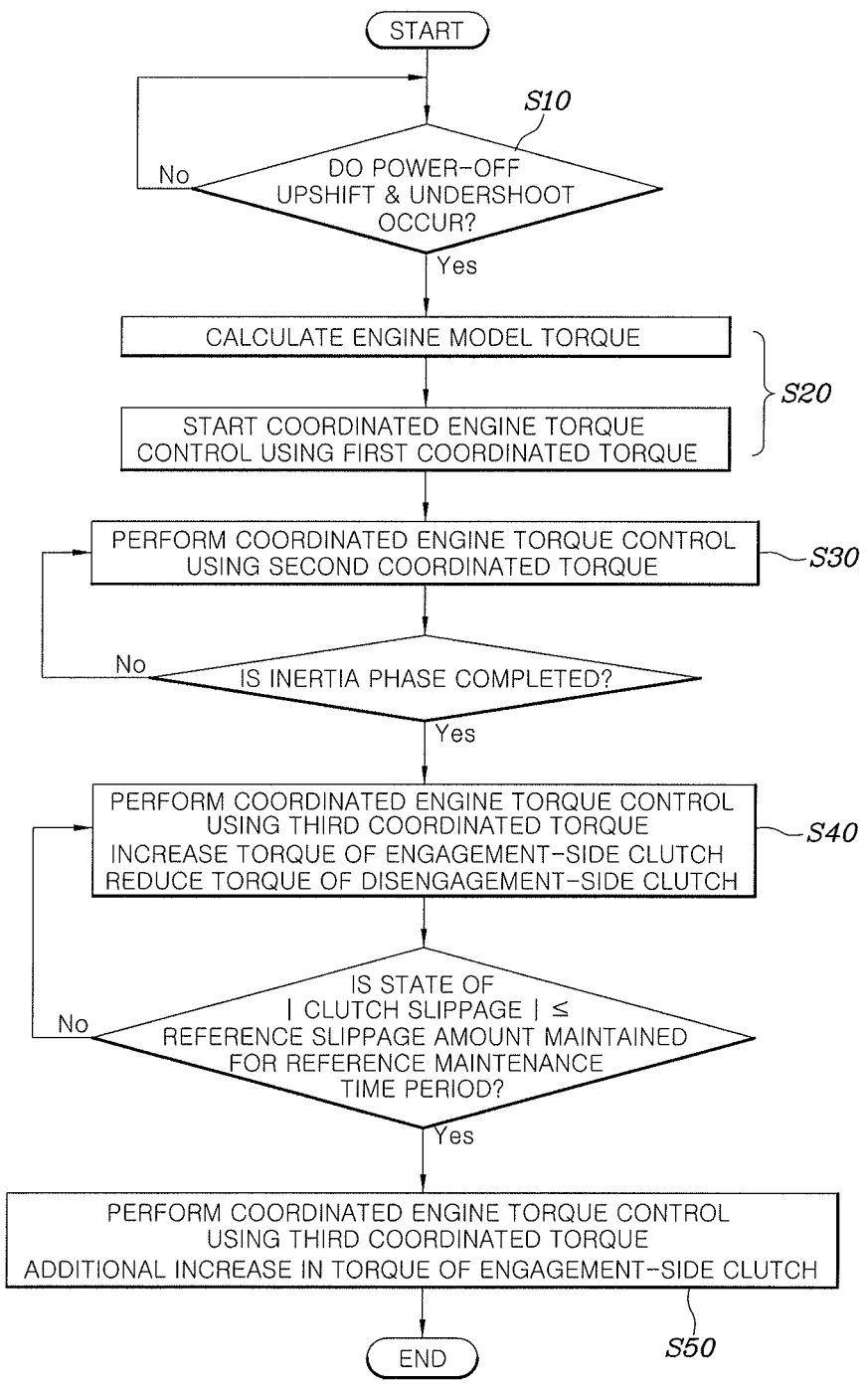
FIG. 2 is a flowchart illustrating a shift control method for a hybrid vehicle having a DCT according to an exemplary embodiment of the present invention.

Referring to FIG. 2, a shift control method for a hybrid vehicle having a DCT according to an exemplary embodiment of the present invention includes: an undershoot determination step (S10) of determining, by a controller, whether the amount of undershoot occurring during an inertia phase of the power-off upshift is equal to or greater than a prescribed reference amount; a response-starting step (S20) of starting, by the controller, when the amount of undershoot is equal to or greater than the prescribed reference amount, coordinated engine torque control using a first coordinated torque, which is determined as the larger one of engine model torque determined from a model and engine map torque obtained from a map in a response to clutch slippage; and a response-maintaining step (S30) of determining, by the controller, second coordinated torque to control the engine and controlling the engine torque until the inertia phase is completed.

That is, when there occurs undershoot in which the rotation speed of the engine becomes lower than the speed of the engagement-side clutch during the inertia phase of the power-off upshift, the present invention determines the occurrence of undershoot and controls the engine torque to diminish the undershoot at the response-maintaining step (S30), preventing the undershoot from being intensified and immediately eliminating the undershoot. As a result, the deterioration in the shifting sensation is prevented, and the drivability of the vehicle is improved.

The reference value may be set by design choices, such as the amount of undershoot to be eliminated at the response-maintaining step (S30).

That is, when it is desired to actively respond to the occurrence of even a small amount of undershoot through the response-maintaining step (S30), the reference value may be set to be relatively small. On the other hand, when it is desired to perform the response-maintaining step (S30) when a relatively large amount of undershoot occurs, the reference value may be set to be relatively large.

The model from which the engine model torque is determined is expressed by the following Equation 1.

$$Te\_m = T_{c\_app} + Je[(dSlip/dt)_{target} + dNi/dt] + \alpha \quad \text{Equation 1}$$

where $Te\_m$ represents engine model torque, $T_{e\text{-}app}$ represents torque of the engagement-side clutch, $J_e$ represents the moment of inertia of the engine, Slip represents clutch slippage (=Ne−Ni), Ne represents a rotation speed of the engine, Ni represents a speed of the engagement-side clutch, $(dSlip/dt)_{target}$ represents a change rate of target slippage, and $\alpha$ represents torque caused by the inertia of the driving system.

The map used for determination of the engine map torque is configured to determine the engine map torque in a response to the clutch slippage and basic input torque of the DCT. The engine map torque may be expressed using the following equation: Engine Map Torque=MAP[Slip,TQI_J].

Here, the basic input torque (TQI_J) of the DCT is basic torque input to the DCT from the engine. That is, the basic input torque (TQI_J) of the DCT is basic torque input to the DCT as the EMS makes a determination by itself in a response to a signal from the APS and controls the engine based on the determination thereof in the state in which the controller CLR does not request the EMS to control the torque of the engine depending on the shift state of the vehicle. The basic input torque of the DCT includes regenerative braking torque, which is caused as the motor performs a regenerating braking function. The basic input torque of the DCT will be simply referred to as "basic input torque".

That is, as illustrated in FIG. 1, during an inertia phase of the power-off upshift in the hybrid powertrain, in which the engine and the motor are connected to each other at all times, the present invention immediately performs coordinated engine torque control based on the engine model torque determined using the model described above, preventing the undershoot of the rotation speed of the engine, which occurs due to the regenerative braking torque by the motor, from being intensified and diminishing the undershoot.

The coordinated torque used to perform the coordinated engine torque control at the response-starting step (S20) is the first coordinated torque, as described above. The first coordinated torque is determined as the larger one of the engine model torque and the engine map torque. However, since the engine model torque, which is determined by inputting the change rate of target slippage that the controller intends to control to the powertrain model including the engine and the clutch, more rapidly diminishes the undershoot at the initial stage of the control operation responding to the undershoot than the engine map torque determined based on the clutch slippage, the first coordinated torque may be determined as the engine model torque when the response-starting step (S20) needs to be performed.

Here, "inertia phase" of the power-off upshift signifies a synchronization process of changing the rotation speed of the engine from the speed of the disengagement-side clutch to the speed of the engagement-side clutch by reducing the torque of the disengagement-side clutch. "Torque phase", which is performed after the inertia phase, signifies a process of completing the shift operation by gradually increasing the torque of the engagement-side clutch while gradually reducing the torque of the disengagement-side clutch until the disengagement-side clutch is completely disengaged.

The second coordinated torque at the response-maintaining step (S30) is determined from the following Equation 2.

$$Te(t) = \text{MAX}\{\text{MAX}[TQI\_J, Te(t-1) + \text{Ramp Down}(C)], \text{MAP}[Slip, TQI\_J]\} \quad \text{Equation 2}$$

where $Te(t)$ represents coordinated torque in the current control cycle, MAX represents a function returning the largest value between two data in following parenthesis, $Te(t-1)$ represents coordinated torque in the previous control cycle, TQI_J represents basic input torque, Ramp Down(C) represents the amount of torque reduced at a constant inclination C, MAP[Slip, TQI_J] represents the engine map torque being determined by the clutch slippage and the basic input torque of the DCT, Slip represents clutch slippage (=Ne−Ni), Ne represents a rotation speed of the engine, and Ni represents a speed of the engagement-side clutch.

That is, the second coordinated torque at the response-maintaining step (S30) is used to cause the coordinated torque used for the coordinated engine torque control to converge to the basic input torque by gradually reducing the coordinated torque from the first coordinated torque, which was used as an initial value of the coordinated engine torque control at the response-starting step (S20), at the constant inclination C.

In other words, at the response-starting step (S20), the controller requests the EMS to sharply increase the torque of the engine to the first coordinated torque, and at the response-maintaining step (S30), the additional torque of the engine that the controller requests the EMS to increase is gradually reduced to 0.

Here, the inclination C may be set as the value at which the coordinated torque is linearly reduced from the first coordinated torque to the basic input torque during the estimated time remaining until completion of the inertia phase.

Upon determining that the gears for a target shifting stage of the power-off upshift are completely engaged and that the rotation speed of the engine and the speed of the engagement-side clutch have been nearly synchronized with each other within a predetermined range of clutch slippage, the controller is configured to determine that the inertia phase has been completed.

For example, in the case in which the target shifting stage is a fourth range, when the gears for the fourth range are completely engaged and when the clutch slippage is 50 RPM or less, the controller may be configured to determine that the inertia phase has been completed.

After the response-maintaining step (S30), to cause the second coordinated torque to gradually converge to the basic input torque, the controller performs a torque handover step (S40) of determining third coordinated torque, controlling the torque of the engine based on the third coordinated torque, gradually increasing the torque of the engagement-side clutch, and gradually reducing the torque of the disengagement-side clutch until the disengagement-side clutch is disengaged.

That is, the torque handover step (S40) substantially corresponds to the torque phase described above. The torque phase is a process of completing the shift operation by completely disengaging the disengagement-side clutch and increasing the torque of the engagement-side clutch, on which the basic input torque and the regenerative braking torque by the motor act together, up to the point where slippage of the engagement-side clutch does not occur.

In the exemplary embodiment of the present invention, the torque phase is divided into the above torque handover step (S40) and a shift-completing step (S50) to be described later.

The third coordinated torque at the torque handover step (S40) is determined using the following Equation 3.

$$Te(t)=MAX[TQI\_J, Te(t-1)+\text{Ramp Down}(E)] \quad \text{Equation 3}$$

where Te(t) represents coordinated torque in the current control cycle, MAX represents a function returning the largest value between two data in following parenthesis, Te(t−1) represents coordinated torque in the previous control cycle, TQI_J represents basic input torque, and Ramp Down (E) represents the amount of torque reduced at a constant inclination E.

That is, when the torque handover step (S40) starts, the coordinated torque used for the coordinated engine torque control is gradually reduced at the constant inclination E.

Of course, at the initial time point of the torque handover step (S40), the coordinated torque in the previous control cycle may be the second coordinated torque.

The second coordinated torque, as described above, is controlled to gradually converge to the basic input torque at the response-maintaining step (S30). Thus, the coordinated torque may converge to the basic input torque at the torque handover step (S40). At the instant time, the third coordinated torque is the basic input torque. In the case in which the coordinated torque does not reach the basic input torque until the response-maintaining step (S30) is completed, the coordinated torque is controlled by the third coordinated torque to converge to the basic input torque at the constant inclination E.

Thus, the inclination E may be set as the value at which the coordinated torque at the initial time point of the torque handover step (S40) is linearly reduced to the basic input torque during the target time period required for completion of the torque phase.

If the clutch slippage is maintained at a prescribed reference amount of slippage or less for a prescribed reference maintenance time period during the torque handover step (S40), the controller performs the shift-completing step (S50) of completing the shift operation by increasing the torque of the engagement-side clutch so that the engagement-side clutch is prevented from slipping with respect to the basic input torque.

The reference amount of slippage may be set as the value, e.g., 20 RPM, at which the rotation speed of the engine and the speed of the engagement-side clutch are synchronized with each other with little difference therebetween to avoid the occurrence of shocks even when the torque of the engagement-side clutch is greatly increased. The reference maintenance time period may be set as the value at which it may be confirmed that the state in which the clutch slippage is maintained at the prescribed reference amount of slippage or less is not temporary but rather long-lasting.

That is, in the exemplary embodiment of the present invention, the torque phase is operated such that, when shifting shock does not occur any more even though the torque of the engagement-side clutch is further increased during the torque handover step (S40), the process immediately goes to the shift-completing step (S50), in which the torque of the engagement-side clutch is increased based on the following equation up to the point where slippage of the engagement-side clutch does not occur even when the regenerative braking torque is input to the DCT. This operation is expressed as "additional increase in torque of engagement-side clutch" in FIG. 2.

The torque of the engagement-side clutch at the shift-completing step (S50) is determined using the following Equation 4.

$$Tc_{app}(t)=Tc_{app}(t-1)+\{[|TQI\_J*\text{Factor}(Speed,TQI\_J)|-Tc_{app}(t-1)]/[\text{Target Time}(H)-\text{Phase Time}]\} \quad \text{Equation 4}$$

where $Tc_{app}(t)$ represents torque of the engagement-side clutch in the current control cycle, $Tc_{app}(t-1)$ represents torque of the engagement-side clutch in the previous control cycle, TQI_J represents basic input torque, Factor (Speed, TQI_J) represents a value being determined via a map or formula according to Speed and TQI_J, Target Time(H) represents a target time period H required for completion of the torque phase, and Phase Time represents the elapsed time taken for the torque phase.

That is, the torque of the engagement-side clutch is determined by dividing the difference between the basic input torque, including the regenerative braking torque, and the torque of the engagement-side clutch in the previous control cycle by the time remaining to completion of the torque phase and adding the value obtained by the division to the torque of the engagement-side clutch in the previous control cycle.

Furthermore, the difference between the basic input torque and the torque of the engagement-side clutch in the previous control cycle may be increased or decreased by reflecting the vehicle speed and the intensity of the basic input torque, i.e., by multiplying the basic input torque by a factor determined in consideration of the basic input torque and the vehicle speed.

Therefore, it may be desirable to design such that the factor is determined using a function or a map of the vehicle speed and the basic input torque.

Furthermore, at the shift-completing step (S50), the coordinated torque is controlled by the third coordinated torque so that the engine torque converges to the basic input torque until the inertia phase is completed.

As is apparent from the above description, according to the shift control method for a hybrid vehicle having a DCT according to an exemplary embodiment of the present invention, it is possible to immediately eliminate an excessive undershoot phenomenon, which may occur during power-off upshift of a hybrid vehicle having a DCT, improving a shifting sensation and drivability and consequently enhancing the marketability of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift control method for a vehicle having a dual clutch transmission, the shift control method comprising:
   undershoot determination operation of determining, by a controller, when an amount of undershoot occurring during an inertia phase of power-off upshift is equal to or greater than a predetermined reference amount;
   response-starting operation of starting, by the controller, in a response that the amount of the undershoot is equal to or greater than the predetermined reference amount, coordinated engine torque control using a first coordinated torque, which is determined as a larger one of engine model torque determined from a model and engine map torque obtained from a map in a response to clutch slippage; and
   response-maintaining operation of determining, by the controller, a second coordinated torque to control an engine and controlling an engine torque until the inertia phase of the power-off upshift is completed.

2. The shift control method according to claim 1, wherein the model from which the engine model torque is determined is expressed as an equation of:

$$Te\_m = T_{c\_app} + Je[(d\text{Slip}/dt)_{target} + dNi/dt] + \alpha$$

wherein Te_m represents engine model torque, $T_{c\_app}$ represents torque of an engagement-side clutch,
   wherein $J_e$ represents a moment of inertia of the engine,
   wherein Slip represents clutch slippage (=Ne−Ni),
   wherein Ne represents a rotation speed of the engine,
   wherein Ni represents a speed of the engagement-side clutch, and
   wherein α represents torque caused by inertia of a driving system.

3. The shift control method according to claim 1,
   wherein the map used for determination of the engine map torque is configured to determine the engine map torque in a response to the clutch slippage and a predetermined input torque.

4. The shift control method according to claim 1,
   wherein the second coordinated torque at the response-maintaining operation is determined as an equation of:

$$Te(t) = \text{MAX}\{\text{MAX}[TQI\_J, Te(t-1) + \text{Ramp Down}], MAP[\text{Slip}, TQI\_J]\}$$

wherein Te(t) represents coordinated torque in a current control cycle,
   wherein Te(t−1) represents coordinated torque in a previous control cycle,
   wherein TQI_J represents predetermined input torque,
   wherein Ramp Down represents an amount of torque reduced at a constant inclination,
   wherein Slip represents clutch slippage (=Ne−Ni),
   wherein Ne represents a rotation speed of the engine, and
   wherein Ni represents a speed of an engagement-side clutch.

5. The shift control method according to claim 1,
   wherein, after the response-maintaining operation, to cause the second coordinated torque to converge to a predetermined input torque, the controller is configured to perform torque handover operation of determining a third coordinated torque, controlling the engine torque based on the third coordinated torque, increasing torque of an engagement-side clutch, and reducing torque of a disengagement-side clutch until the disengagement-side clutch is disengaged.

6. The shift control method according to claim 5, wherein the third coordinated torque at the torque handover operation is determined as an equation of:

$$Te(t) = \text{MAX}[TQI\_J, Te(t-1) + \text{Ramp Down}]$$

wherein Te(t) represents coordinated torque in a current control cycle,
   wherein Te(t−1) represents coordinated torque in a previous control cycle,
   wherein TQI_J represents predetermined input torque, and
   wherein Ramp Down represents an amount of torque reduced at a constant inclination.

7. The shift control method according to claim 5,
   wherein, in a response that the clutch slippage is maintained at a predetermined reference amount of slippage or less for a predetermined reference maintenance time period during the torque handover operation, the controller is configured to perform shift-completing operation of completing shift operation by increasing the torque of the engagement-side clutch so that the engagement-side clutch is prevented from slipping with respect to the predetermined input torque.

8. The shift control method according to claim 7,
   wherein the torque of the engagement-side clutch at the shift-completing operation is determined as an equation of:

$$Tc_{app}(t) = Tc_{app}(t-1) + \{[|TQI^*\text{Factor}(\text{Speed}, TQI\_J)| - Tc_{app}(t-1)] / [\text{Target Time} - \text{Phase Time}]\}$$

wherein $Tc_{app}(t)$ represents torque of the engagement-side clutch in a current control cycle,
   wherein $Tc_{app}(t-1)$ represents torque of the engagement-side clutch in a previous control cycle,
   wherein TQI_J represents predetermined input torque,
   wherein Target Time represents a target time period required for completion of a torque phase, and
   wherein Phase Time represents an elapsed time taken for the torque phase.

\* \* \* \* \*